United States Patent

Fernsler et al.

[11] Patent Number: 5,223,931
[45] Date of Patent: Jun. 29, 1993

[54] SYNCHRONIZED SCANNING AT HORIZONTAL FREQUENCY

[75] Inventors: Ronald E. Fernsler; Enrique Rodriguez-Cavazos, both of Indianapolis, Ind.

[73] Assignee: Thomson Consumer Electronics, Inc., Indianapolis, Ind.

[21] Appl. No.: 939,859

[22] Filed: Sep. 2, 1992

Related U.S. Application Data

[63] Continuation of Ser. No. 499,249, Mar. 26, 1990, abandoned.

[51] Int. Cl.⁵ ............................................. H04N 5/12
[52] U.S. Cl. .................................. 358/158; 358/148
[58] Field of Search ............... 358/148, 158; 331/20, 331/50

[56] References Cited

U.S. PATENT DOCUMENTS

| | | | |
|---|---|---|---|
| 3,891,800 | 6/1975 | Janssen et al. | 178/69.5 |
| 4,317,133 | 2/1982 | Fernsler et al. | 358/158 |
| 4,327,376 | 4/1982 | Balaban et al. | 358/159 |
| 4,426,661 | 1/1984 | Okada et al. | 358/140 |
| 4,446,482 | 5/1984 | Srivastava et al. | 358/150 |
| 4,476,490 | 10/1984 | Kaneko | 358/148 |
| 4,520,394 | 5/1985 | Kaneko | 358/150 |
| 4,591,910 | 5/1986 | Lai et al. | 358/148 |
| 4,636,861 | 1/1987 | Willis | 358/158 |
| 4,639,780 | 1/1987 | Willis | 358/150 |
| 4,791,488 | 12/1988 | Fukazawa et al. | 358/149 |
| 4,802,009 | 1/1989 | Hartmeier | 358/158 |
| 4,870,490 | 9/1989 | Sekiya et al. | 358/158 |
| 4,996,596 | 2/1991 | Hirao et al. | 358/158 |

FOREIGN PATENT DOCUMENTS

61-81177 4/1987 Japan .
0216588 9/1987 Japan .

Primary Examiner—James J. Groody
Assistant Examiner—David E. Harvey
Attorney, Agent, or Firm—Joseph S. Tripoli; Joseph J. Laks; Harvey D. Fried

[57] ABSTRACT

A first phase locked loop generates a first timing signal at a first horizontal synchronizing frequency corresponding to a horizontal synchronizing component in a video signal. A converter circuit derives from the first timing signal a second timing signal, having a second frequency at a multiple of the first frequency and subject to a variation in frequency at a rate corresponding to the first frequency. A second phase locked loop comprises a comparator, a low pass filter, a controllable oscillator and a horizontal output deflection stage receives the second timing signal, which can be asymmetric within the period of the first timing signal, and a feedback signal in accordance with the second frequency. The controllable oscillator generates a horizontal synchronizing signal at the second frequency. The second phase locked loop has a characteristic loop response, determined by the low pass filter, preventing the controllable oscillator from changing frequency as fast as the rate of variation of the second timing signal. This drives the error signal for the controllable oscillator toward an average value, resulting in a corrected, symmetric synchronizing signal at the second frequency. The horizontal output deflection stage is synchronized for horizontal scanning in accordance with the second frequency. No additional signal processing circuitry is needed to correct the symmetry of the first timing signal generated by the first phase locked loop or the symmetry of the second timing signal derived by the converter.

28 Claims, 8 Drawing Sheets

FIG. 5(a) — SYNCHRONIZING COMPONENT OF $f_H$ VIDEO, $1/f_H$

FIG. 5(b) — CONTROL VOLTAGE FOR $32f_H$ VCO, 32

FIG. 5(c) — $32f_H$ VCO OUTPUT PULSES, $1/f_{VCO}$

FIG. 5(d) — $1f_H$, $2f_H$-REF 16, 32, $t_A$, $t_B$

FIG. 5(e) — 8, 16, 24, 32

FIG. 5(f) — $2f_H$ RETRACE PULSES, Y1, Y2

SYNCHRONIZED SCANNING AT HORIZONTAL FREQUENCY

This is a continuation of application Ser. No. 499,249, filed Mar. 26, 1990, now abandoned.

This invention relates generally to the field of horizontal deflection systems for television apparatus. More particularly, this invention relates to the generation of horizontal synchronizing signals useful in systems displaying video signals at higher than a basic or standard horizontal scanning rate.

Television apparatus require that the circuits generating the raster scan be synchronized with the video signal being displayed. Standard NTSC video signals, for example, are displayed by interlacing successive fields, each field being generated by a raster scanning operation at a basic or standard horizontal scanning rate of approximately 15,734 Hz.

The basic scanning rate for video signals is variously referred to as $f_H$, $1f_H$, and 1H. The actual frequency of a $1f_H$ signal will vary according to different video standards. In accordance with efforts to improve the picture quality of television apparatus, systems have been developed for displaying video signals progressively, in a noninterlaced fashion. Progressive scanning requires that each displayed frame must be scanned in the same time period allotted for scanning one of the two fields of the interlaced format. Accordingly, the horizontal scanning frequency must be twice that of the interlaced video signals. The scanning rate for such progressively scanned displays is variously referred to as $2f_H$ and 2H. A $2f_H$ scanning frequency according to standards in the United States, for example, is approximately 31,468 Hz. A similar situation is presented when a video signal with a higher horizontal scanning frequency as broadcast or cablecast, for example $2f_H$, is to be displayed at $4f_H$, or at other multiple rates.

A problem that may be encountered in generating a second horizontal synchronizing signal, for example at $2f_H$, from a first horizontal synchronizing signal, for example at $1f_H$, in a video signal, is assuring sufficiently precise symmetry of the second synchronizing signal within the period of the first synchronizing signal. The period of the second signal may vary due to jitter of the edges of the pulses in the first signal. If the symmetry of a $2f_H$ synchronizing signal, for example, is not very precise within any $1f_H$ period, for example, the $2f_H$ trace will be initiated at a different instant every other line in the raster. This can cause a split raster effect, as shown for example in FIG. 8. A raster 2 has a first set of alternate scan lines forming a picture portion R which diverges to the right and a second set of alternate scan lines forming a picture portion L which diverges to the left. Adjacent retrace pulses are of different amplitude because different peak to peak yoke currents flow during adjacent trace periods. Different peak to peak yoke currents flow during adjacent trace periods because adjacent trace periods are of different length. The amount of the scanning difference between adjacent lines will depend on the magnitude of the period difference and the overall energy recovery efficiency of the deflection circuit. The effect of raster splitting is exaggerated in FIG. 8, wherein the scan lines of portion L begin sooner than the scan lines of portion R. However, time differences between adjacent trace periods on the order of only 100 nanoseconds may cause unacceptable amounts of raster splitting.

Phase locked loop systems are widely known and used in television apparatus. Indeed, dual phase locked loop systems have been developed for providing accurate $1f_H$ synchronizing signals. In such a configuration, a first phase locked loop is a conventional phase locked loop in which the output of a voltage controlled oscillator, or the output of a counter divided digital oscillator, is compared to, and subsequently locked to, the incoming horizontal synchronizing pulse stripped from the video signal which is to be processed and displayed on a cathode ray tube. The second phase locked loop, which also operates at a $1f_H$ rate, compares the same oscillator output of the first loop with a $1f_H$ rate pulse representative of the retrace voltage across the deflection yoke used to generate the $1f_H$ scanning current. The error voltage from the second phase comparison is used to generate a pulse width modulating signal which determines the initiation of the $1f_H$ output device turn on, and subsequently, retrace initiation, or the phase of each line within a vertical field. A one shot timing device can provide a constant mark space ratio between the pulse width modulating output signal and the $1f_H$ output switching transistor.

The loop response of the first phase locked loop is usually relatively slow. Accordingly, the first phase locked loop normally has narrow bandwidth to optimize phase jitter reduction with decreased input RF signal strength as evident in fringe reception areas. The second phase locked loop generally has a faster loop response. Accordingly, the second phase locked loop has a wider bandwidth allowing the second phase locked loop to very closely track variations in the raster scanning current due to horizontal output transistor storage time variations and high voltage transformer tuning effects, resulting in a straight, nonbending raster under all beam current loading conditions. The only significant exception to this mode of operation is with respect to those compromises necessary in the first phase locked loop to accommodate signals from video cassette recorders and the like, in which step changes of up to 10 microseconds in phase are sometimes encountered. Tradeoffs in respective loop responses can be made to provide adequate weak signal performance without significant overall degradation of receiver performance.

An asymmetry in the first synchronizing signal, for example at $1f_H$, can be introduced by the very nature of the phase locked loop used in the synchronization system, which requires that the first, or $1f_H$, timing signal be used as a feedback signal to the phase comparator in the phase locked loop. The asymmetry has been corrected in the past, for example, by special signal processing circuits associated with operation of the first phase locked loop and/or the circuit used for converting the $1f_H$ timing signal to a $2f_H$ timing or synchronizing signal. These can be costly, and can result in unwanted delays in propagating synchronizing information through the deflection circuitry.

It is an aspect of this invention to provide a horizontal deflection system having accurate synchronizing circuits for use in displaying video signals at a multiple scanning rate, where an asymmetry stems from a periodic perturbation of a synchronizing/timing signal. In accordance with this aspect of the invention, a first phase locked loop generates a first timing signal at a first horizontal synchronizing frequency corresponding to a horizontal synchronizing component in a video signal. A converter circuit derives from the first timing signal a second timing signal, having a second frequency at a multiple of the first frequency and subject to a variation in frequency at a rate corresponding to the first frequency. A second phase locked loop comprises a comparator, a low pass filter, a voltage controlled oscillator and a horizontal output deflection stage. The compartor receives the second timing signal and a feedback signal in accordance with the second frequency. The voltage controlled oscillator generates a horizontal synchronizing signal at the second frequency. The second phase locked loop has a characteristic loop response preventing the voltage controlled oscillator from changing frequency as fast as the rate of variation of the second timing signal. The horizontal output deflection stage may be synchronized for horizontal scanning in accordance with the second frequency. The two phase locked loops are configured in tandem, in conjunction with the signal rate converter, or multiplier. No additional signal processing circuitry is needed to correct the symmetry of the timing signal generated by the first phase locked loop or the symmetry of the multiple rate timing signal derived by the converter.

In an illustrative embodiment, the first phase locked loop operates at a first horizontal scanning frequency, for example $1f_H$, and the second phase locked loop, including a voltage controlled oscillator, operates at a second horizontal scanning frequency which is a multiple of the first frequency, $2f_H$. The first phase locked loop synchronizes a $1f_H$ voltage controlled oscillator output, or counter divided oscillator output, to the synchronizing signal of an incoming $1f_H$ video signal. The second phase locked loop synchronizes the raster scanning with a $2f_H$ video signal from a $2f_H$ speedup video processing system.

The symmetry of the second timing signal within the period of the first timing signal need not be exact. Rather, the second phase locked loop is characterized by a loop operation which averages the asymmetry errors due to deviations of the first timing signal from a fifty percent duty cycle. Therefore, the second phase locked loop automatically provides correction of asymmetry, and at the same time, locks the horizontal output deflection stage to the generated second synchronizing signal. The second synchronizing signal and the horizontal deflection circuit have the same frequency and a fixed phase relationship.

The response of the second phase locked loop is slow enough to reject any component of the first timing signal, but fast enough to track video cassette recorder type signals, as these types of signals will produce a response first from the first loop and secondly from the second loop. The second phase locked loop has a low pass filter which prevents the voltage controlled oscillator thereof from changing frequency as fast as the error signal changes due to the asymmetry of the uncorrected second timing signal. The error signal changes at the rate of the first timing signal. In a $1f_H$ to $2f_H$ system, for example, the $2f_H$ voltage controlled oscillator does not respond quickly to the frequency variation of the uncorrected $2f_H$ timing signal from the converter, which varies at the $1f_H$ rate. By the time the $2f_H$ voltage controlled oscillator increases frequency a little, for example, responsive to an error correction control signal, the error control signal tries to reduce the frequency. This has the effect of driving the error signal closer to an average value, which results in a smooth $2f_H$ rate. Raster bends are corrected by the fast nature of the second phase locked loop.

It is another aspect of the invention to provide a smoothing circuit for correcting asymmetry errors in multiple rate synchronizing systems due to periodic perturbations in a synchronizing or timing signal. In accordance with this aspect of the invention, a signal source generates a first timing signal at a first frequency, subject to a periodic variation in frequency at a rate in accordance with a second, lower frequency. A phase locked loop has means for receiving the first timing signal and a feedback signal in accordance with the first frequency, and has a controllable oscillator for generating a horizontal synchronizing signal at the first frequency. The phase locked loop has a characteristic loop response preventing the controllable oscillator from changing frequency as fast as the rate of variation of the first timing signal. A horizontal output deflection stage may be coupled as part of the phase locked loop for synchronized horizontal scanning in accordance with the first frequency and for generating the feedback signal. The errors are corrected by operation of a low pass filter in the phase locked loop adapted to reject any signal components in accordance with the second frequency. A second phase locked loop may generate a second timing signal in accordance with the second frequency, synchronized with a horizontal synchronizing component of a video signal. The low pass filter prevents the oscillator from changing frequency as fast as the error signal changes due to the asymmetry of the first timing signal within the period of the second timing signal. As a result, the error signal tends toward an average value, which smooths the output of the oscillator. The first frequency is a multiple of said second frequency, for example an even multiple.

Figure 1:
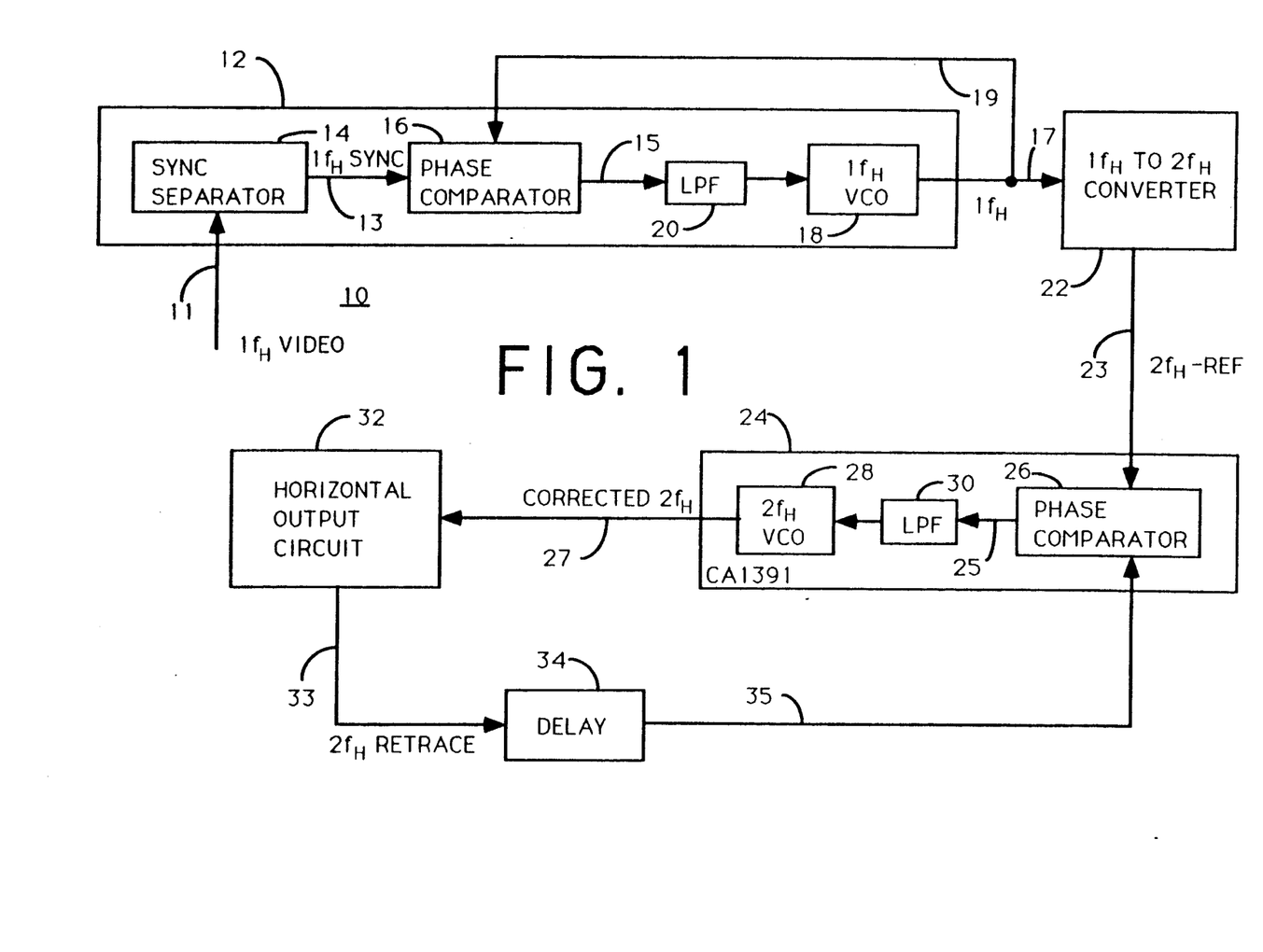
FIG. 1 is a block diagram of a horizontal deflection system in accordance with this invention, having synchronizing circuits for generating timing signals to display $1f_H$ video signals at a $2f_H$ horizontal scanning rate.

A synchronization system for displaying $1f_H$ video signals at a $2f_H$ scanning rate is shown in block diagram form in FIG. 1, and generally designated by reference numeral 10. An analog circuit 12, for example, comprises a sync separator 14, a phase comparator 16 and a voltage controlled oscillator 18 having a $1f_H$ rate output signal. Voltage controlled oscillator is denoted $1f_H$ VCO. A $1f_H$ video signal is an input on line 11 to sync separator 14. The $1f_H$ video signal may be a standard NTSC interlaced video signal. The sync separator 14 provides horizontal synchronizing pulses on line 13 as one input to phase comparator 16 and vertical synchronizing pulses on another output line, not shown. The output of phase comparator 16 on line 15 is an input to low pass filter 20, denoted LPF. The error control signal generated by phase comparator 16 on line 15 is integrated by low pass filter 20 to develop an error control signal for voltage controlled oscillator 18. The output of voltage controlled oscillator 18 on line 17 is a $1f_H$ frequency timing signal. The $1f_H$ timing signal on line 17 is an input to $1f_H$ to $2f_H$ converter 22. The $1f_H$ timing signal on line 17 is fed back on line 19 as the second input to phase comparator 16. Phase comparator 16, voltage controlled oscillator 18 and feedback path 19 form a first phase locked loop, generating a $1f_H$ rate output signal. The $1f_H$ timing signal on line 17 is phase locked to the synchronizing signals of the $1f_H$ video input on line 11.

A $1f_H$ to $2f_H$ converter 22 generates a $2f_H$ rate timing signal on line 23 from the $1f_H$ timing signal on line 17. The $2f_H$ timing signal on line 23 is an uncorrected timing signal, denoted $2f_H$-REF. The operation of the 1fH to $2f_H$ converter 22 is explained in more detail in connection with FIG. 3.

The $2f_H$ timing signal on line 23 will be symmetrical only in so far as the $1f_H$ timing signal on line 17 has a perfect, or nearly perfect, fifty percent duty cycle and tight tolerance parts are used in the $1f_H$ to $2f_H$ converter 22. As a practical matter, the duty cycle of the $1f_H$ signal may exhibit unacceptable deviation from fifty percent duty cycle due to $1f_H$ jitter.

Figure 2A:
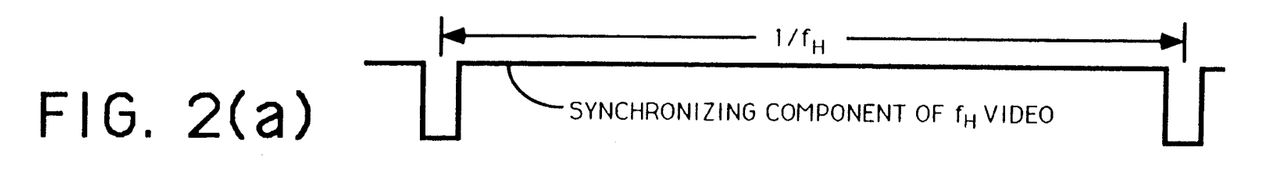
FIGS. 2(a), 2(b), 2(c), 2(d) and 2(e) are waveforms useful for explaining the asymmetry inherent in the circuit shown in FIG. 1.
Figure 2B:
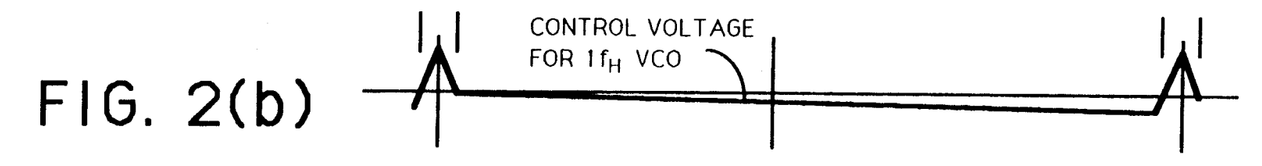
Figures 2C, 2D:
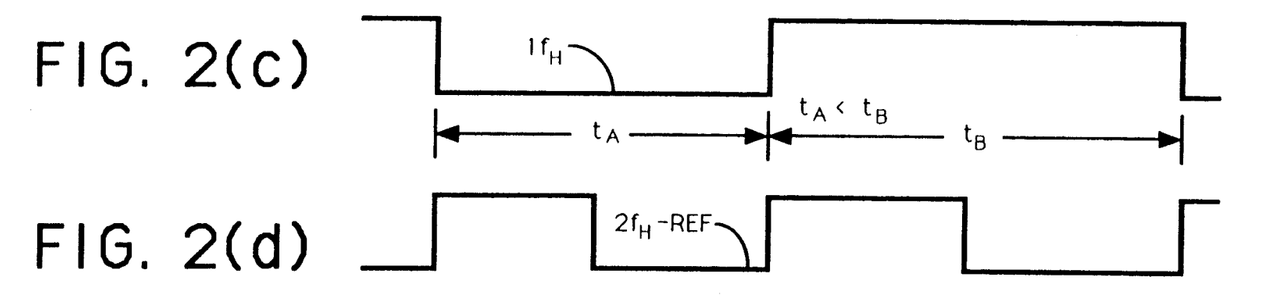
Figure 2E:
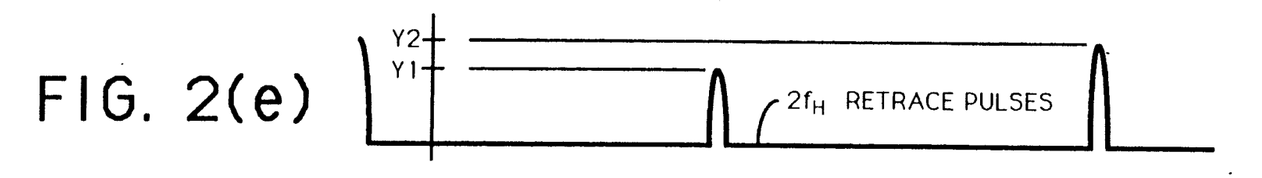
Figure 8:
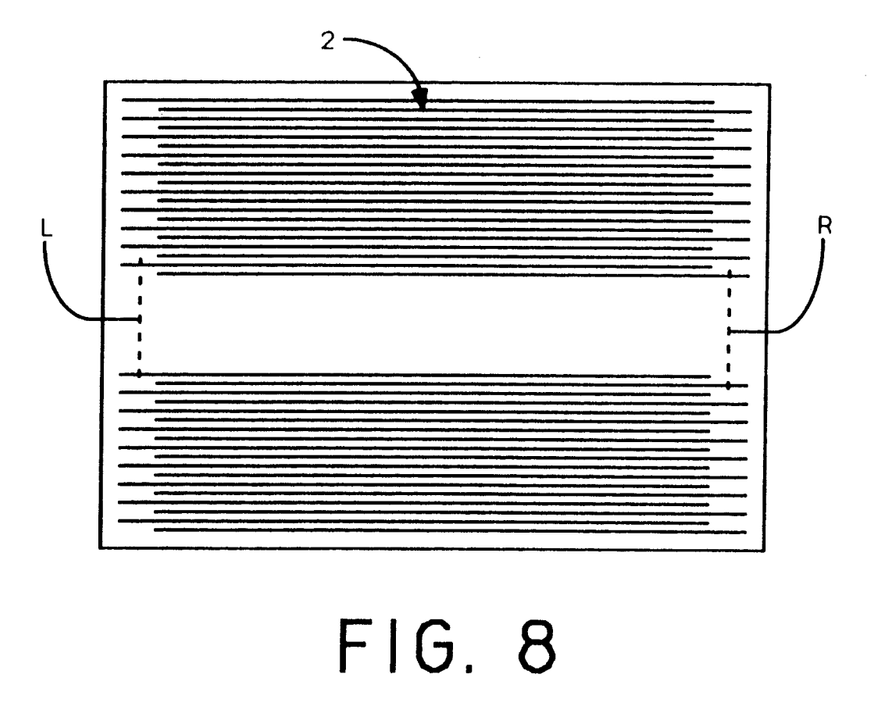
FIG. 8 is a diagram illustrating raster splitting due to asymmetry of a $2f_H$ synchronizing signal within the period of a $1f_H$ synchronizing signal.

The term $1f_H$ jitter is used herein to refer to a $1f_H$ cyclical variation of the output of the low pass filter 20, which is the error correction signal for the voltage controlled oscillator 18. The $1f_H$ jitter causes a cyclical variation of the output of voltage controlled oscillator 18, at the $1f_H$ rate. The $1f_H$ synchronizing pulses shown in FIG. 2(a) are separated from the $1f_H$ video signal by sync separator 14. The error signal, or control voltage, shown in FIG. 2(b) is typical of how the $1f_H$ jitter can occur. The jitter may result from feeding back the $1f_H$ timing signal to the phase comparator. The error control signal gradually decreases over most of the $1/f_H$ period, which causes the frequency of the $1f_H$ VCO to gradually decrease during each $1/f_H$ period. The $1f_H$ signal produced by voltage controlled oscillator 18 shown in FIG. 2(c) is phase locked to the synchronizing pulses. The frequency of the voltage controlled oscillator varies to track the $1f_H$ synchronizing pulses. The $2f_H$ timing signal, which is derived from the $1f_H$ signal, has two pulses for each period of the $1f_H$ signal as shown in FIG. 2(d). The first $2f_H$ pulse shown has a period $t_A$ and the next successive $2f_H$ pulse has a period $t_B$. Due to the typical variation in the control signal for the $1f_H$ VCO, the periods $t_A$ and $t_B$ may not be equal. As shown in FIG. 2(c), for example, $t_A$ is shorter than $t_B$. Therefore, the retrace pulses which would result from the uncorrected $2f_H$-REF signal have greater amplitudes during the alternate periods $t_B$ than during the alternate periods $t_A$ as shown in FIG. 2(e). An alternating succession of retrace pulses having different amplitudes Y1 and Y2 results in the two sets of alternating trace lines having different starting points, as illustrated in FIG. 8. The uncorrected timing signal $2f_H$-REF on line 23 may exhibit unacceptable asymmetry, which might result in a raster split.

A second phase locked loop is formed with a television horizontal processor circuit 24, which may be embodied as an industry type CA1391. Functions in the CA1391 include a phase detector, an oscillator, a Vcc voltage regulator and a predriver.

The $2f_H$-REF timing signal on line 23, which as noted may be adversely affected by jitter in the $1f_H$ timing signal on line 17, is an input to the phase comparator 26 of processor circuit 24. The output of phase comparator 26 on line 25 is an input to a low pass filter 30. Voltage controlled oscillator 28 generates a $2f_H$ rate output signal, and is denoted $2f_H$ VCO. The error control signal generated by phase comparator 26 is integrated by low pass filter 30. The output of voltage controlled oscillator 28 on line 27 provides a CORRECTED $2f_H$ signal for horizontal output circuit 32. The horizontal output circuit 32 generates a horizontal scanning current, and provides $2f_H$ RETRACE pulses on line 33. The retrace pulses are an input to a delay circuit 34, for adjusting the phase of the CORRECTED $2f_H$ signal relative to the uncorrected $2f_H$-REF timing signal. The uncorrected $2f_H$-REF timing signal has a fixed phase relationship with the $1f_H$ timing signal, through the $1f_H$ to $2f_H$ converter 22. The output of the delay circuit 34 on line 35 is a second input to phase comparator 26.

The operation of the second phase locked loop is such as to average period and frequency variations of the pulses in the $2f_H$-REF timing signal, caused by jitter of the $1f_H$ timing signal. More particularly, the time constants of the low pass filters of the respective phase locked loops are set to provide the $1f_H$ phase locked loop with a slower loop response than that of the $2f_H$ phase locked loop. The $1f_H$ loop is relatively slow, that is, having a narrow bandwidth to optimize rejection of phase jitter with decreased RF signal strength, which may be evident in fringe reception areas. The $2f_H$ loop is typically faster, that is, having a wider bandwidth to optimize tracking variations in the raster scanning current due to horizontal output transistor storage time variations and high voltage transformer tuning effects. The result is a straight nonbending raster under all beam current loading conditions. An exception to this mode of operation is in regard to the compromises necessary in the 1fH loop to accommodate signals from video cassette recorders and the like, in which step changes of up to 10 microseconds are sometimes encountered. Tradeoffs can be made to weak signal performance without significant overall degradation of receiver performance.

If the asymmetry of the $2f_H$ pulses within a given $1f_H$ period is such that the first of the two pulses in the given $1f_H$ period has a frequency that is too high, the next pulse will have a frequency which is too low, and vice versa. Referring to FIG. 2(c), $t_A + t_B$ is constant, equalling the $1f_H$ period. The variations of the $2f_H$-REF signal will always result in successive error signals of an opposite sense for each $1f_H$ period. This will be true except in those instances when there happens to be no asymmetry error and no error voltage in a given $1f_H$ period. The lows pass filter of the $2f_H$ loop will not let the $2f_H$ voltage controlled oscillator change frequency as fast as changes occur in the error control signal resulting from variations in the uncorrected $2f_H$-REF timing signal, which occur at a $1f_H$ rate. By the time the $2f_H$ voltage controlled oscillator decreases frequency a little, for example in response to an increase in the frequency of the $2f_H$-REF timing signal during a period $t_A$ the error signal changes senses to increase the frequency in response to the subsequent decrease in the frequency of the 2f$_H$-REF signal during the subsequent period t$_B$ of the same 1f$_H$ period. This has the effect of driving the error control signal closer to an average value, which results in a smooth 2f$_H$ DRIVE signal. Accordingly, the CORRECTED 2f$_H$ synchronizing signals on line 27 are sufficiently symmetrical within the period of the 1f$_H$ timing signal to prevent raster splitting. Stated more broadly, the second phase locked loop is not only effective to lock the CORRECTED 2f$_H$ signal to the 1f$_H$ synchronizing signal, the second phase locked loop is effective to average out the timing errors in the uncorrected 2f$_H$-REF signal due to 1f$_H$ jitter. The timing errors cannot be corrected by employing a phase control loop, which does not include an oscillator.

Figure 3:
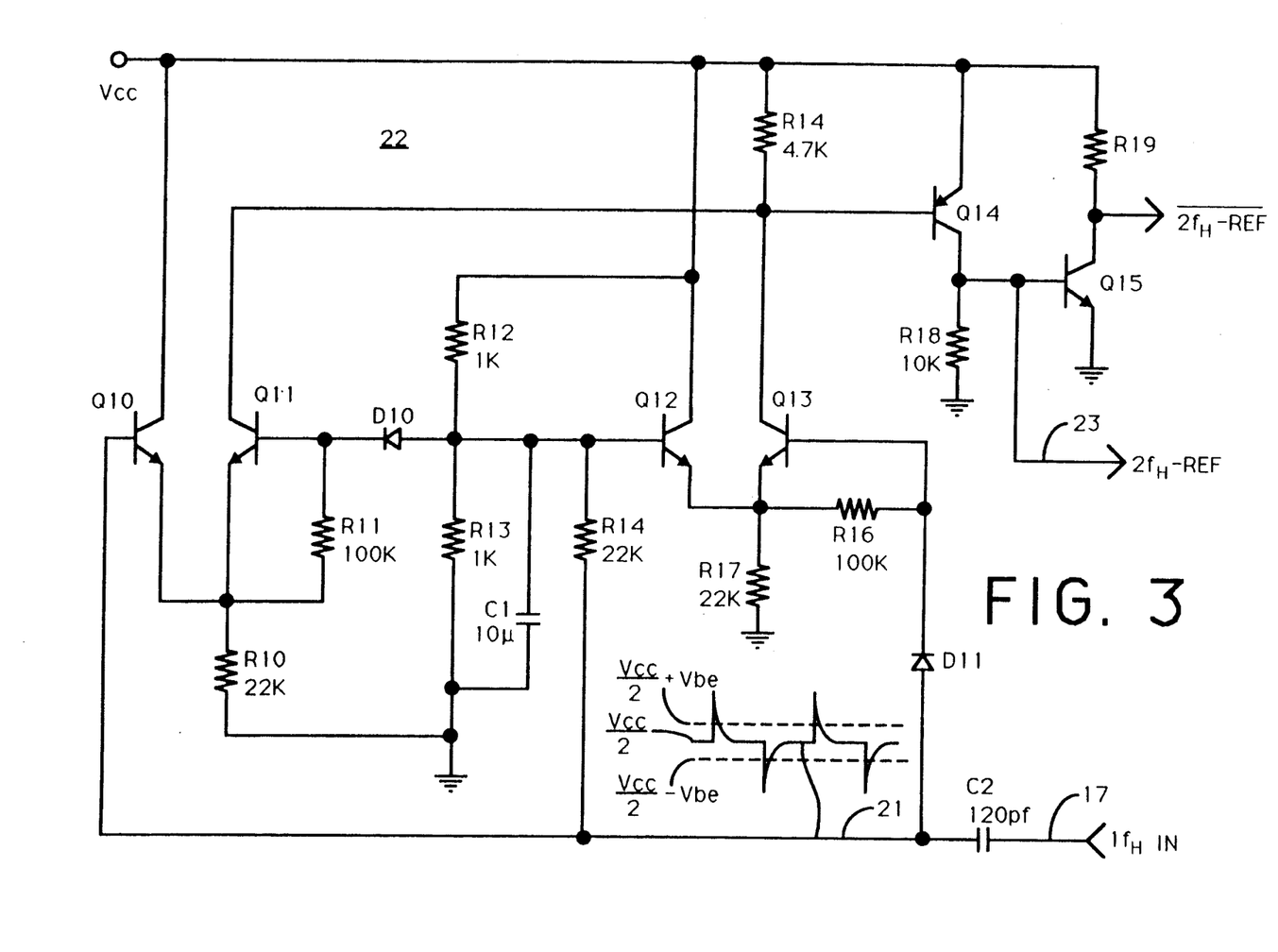
FIG. 3 is a schematic of a $1f_H$ to $2f_H$ analog converter suitable for use in the synchronization system shown in FIG. 1.

FIG. 3 illustrates a suitable 1f$_H$ to 2f$_H$ converter circuit 22, which may be utilized in the circuit shown in FIG. 1. The circuit 22 generates a 2f$_H$ timing signal on line 23 responsive to a 1f$_H$ timing signal on line 17. Positive pulses of the 2f$_H$-REF output signal on line 23 are generated when transistor Q14 conducts. An inverted output signal is available at the collector of transistor Q15. Conduction of transistor Q14 is controlled by two pairs of transistor switches, Q10 and Q11 on the one hand, and Q12 and Q13 on the other hand.

The 1f$_H$ timing signal is capacitively coupled to converter circuit 22 through capacitor C2. The effect of capacitor C2 is to convert each rising edge of the 1f$_H$ timing signal to a positive pulse and each trailing edge thereof to a negative pulse, as shown by the waveform on line 21. In the absence of such pulses, the voltage level at the base of transistor Q12 will be Vcc/2 and by the action of the voltage divider formed by resistors R12 and R13. Vcc may be +16 volts, for example. The voltage at the emitters of transistors Q12 and Q13 will be Vcc/2−Vbe, by reason of the emitter follower configuration of transistor Q12. The anode of diode D11 will also be at Vcc/2, and the cathode of diode D11 will therefore be at Vcc/2 Vbe, which voltage appears at the base of transistor Q13. Accordingly, in this quiescent state, transistor Q12 is turned on and transistor Q13 is turned off. The base of transistor Q11 will be at Vcc/2−Vbe due to the voltage drop across diode D10. The base of transistor Q10, which is also line 21, will be at Vcc/2. The emitters of transistors Q10 and Q11 will be at Vcc/2−Vbe. Accordingly, in the same quiescent state, transistor Q10 will be turned on and transistor Q11 will be turned off. Whenever a positive voltage spike raises the voltage level at the anode of diode D11 to Vcc/2+Vbe, the voltage at the base of transistor Q13 will be raised to Vcc/2, and of sufficient magnitude to turn on transistor Q13. At the same time, transistor Q12 will be turned off. When transistor Q13 turns on, the base of transistor Q14 will be pulled to ground, and transistor Q14 will turn on. When transistor Q14 turns on, a positive 2f$_H$ rate pulse will be initiated at the collector of transistor Q14. When the positive voltage spike terminates, the additional voltage across capacitor C2 will be dissipated at a time constant determined by the values of resistor R14 and capacitor C2. When capacitor C2 is sufficiently discharged, transistor Q13 will turn off and transistor Q12 will turn on. When transistor Q13 turns off, transistor Q14 turns off, and the 2f$_H$ pulse is terminated. When a negative voltage spike lowers the voltage on line 21 to Vcc/2 Vbe, transistor Q11 will be turned on and transistor Q10 will be turned off. When transistor Q11 turns on, transistor Q10 will be turned off. When transistor Q11 turns on, transistor Q14 turns on, and produces another positive 2f$_H$ pulse. When the negative voltage spike terminates, and the charge on capacitor C2 discharges, transistor Q11 will turn off and transistor Q10 will turn on. When transistor Q11 turns off, transistor Q14 turns off, and terminates the positive pulse. Although the width of the 2f$_H$-REF pulses on line 23 will be subject to some variation, this variation is of no consequence, as the phase comparator 26 of a 1391 type integrated circuit is edge sensitive. It is only necessary that the pulse width of the 2f$_H$-REF pulses be wider than approximately one-half of the retrace derived pulse which is the other input to the phase comparator. This minimum width can be assured by the proper selection of capacitor C2 and resistor R14. At the same time, the pulse width should be maintained as narrowly as is necessary, in order to maintain a fast switching response in the converter circuit.

Figure 4:
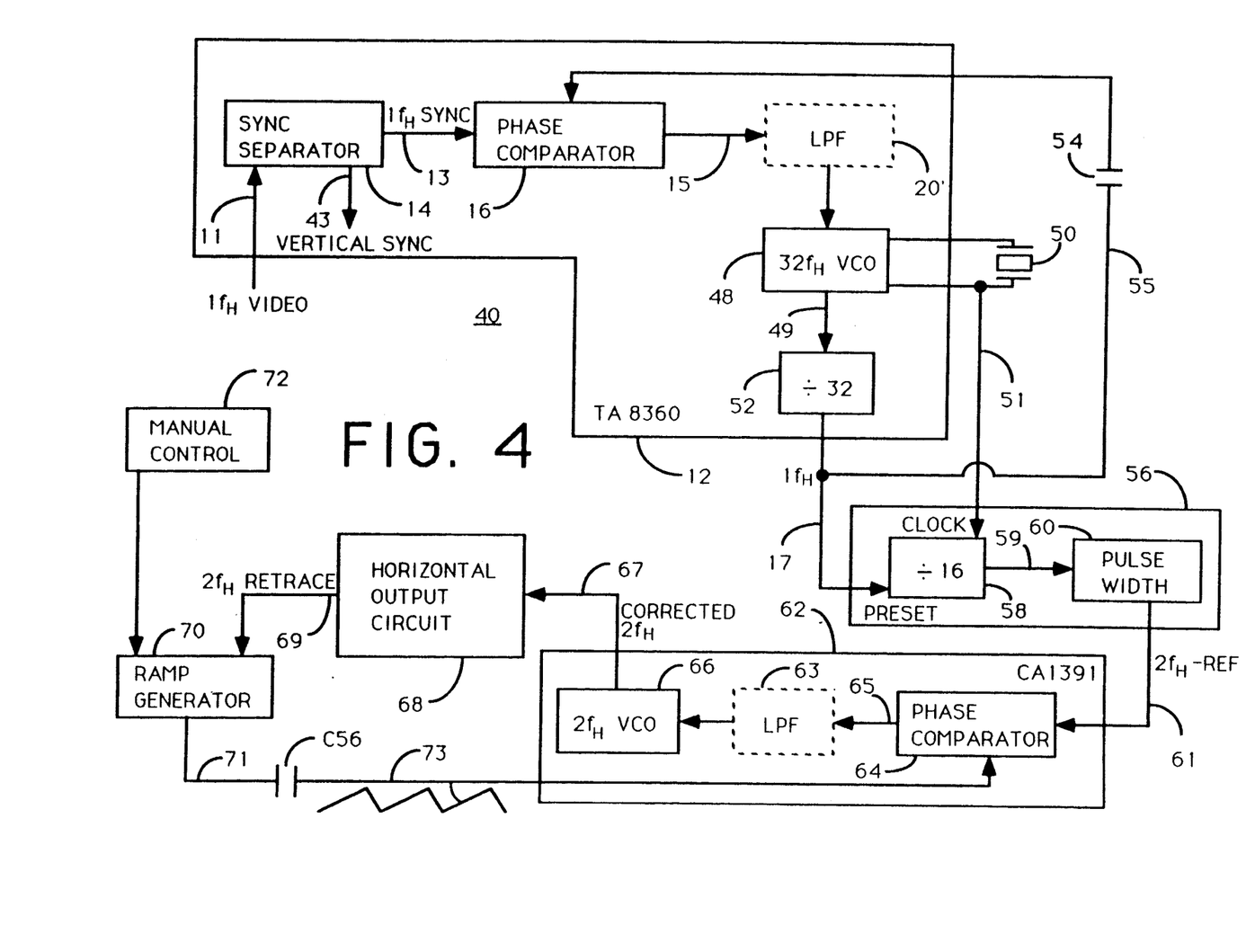
FIG. 4 is a block diagram of a horizontal deflection system in accordance with this invention, having synchronizing circuits for generating timing signals to display a progressively scanned video output, and including a $1f_H$ to $2f_H$ digital signal converter.
Figure 5A:
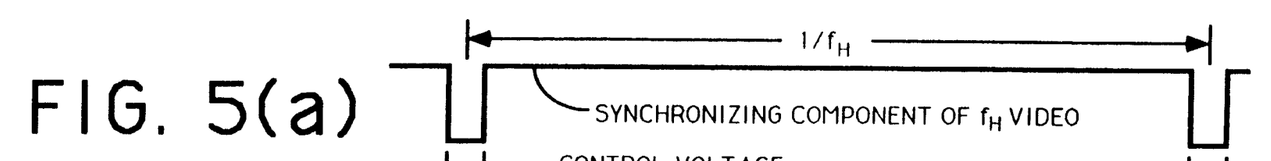
FIGS. 5(a), 5(b), 5(c), 5(d), 5(e) and 5(f) are waveforms useful for explaining the asymmetry inherent in the digital circuit shown in FIG. 4.
Figures 5B, 5C, 5D:
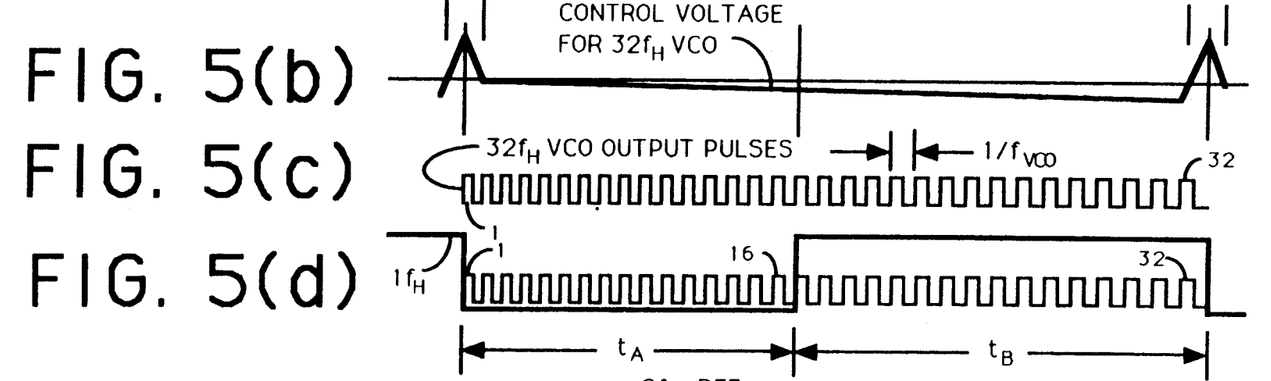
Figure 5E:
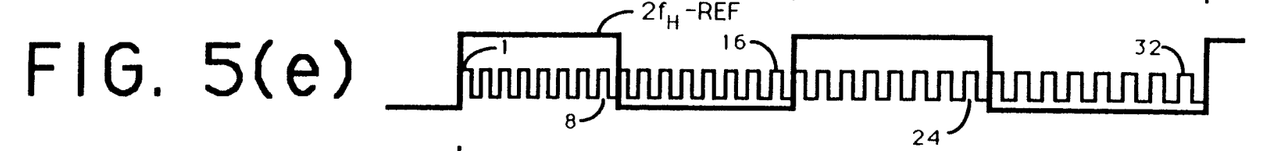

A synchronization system for a total 2f$_H$ deflection synchronization system is shown in block diagram form in FIG. 4, and generally designated by reference numeral 40. The 1-chip 12 shown in FIG. 1 is embodied as an industry type TA8360 1-chip. A 1f$_H$ video signal on line 11 is an input to sync separator 14. The sync separator 14 provides vertical synchronizing pulses on line 43 and 1f$_H$ horizontal synchronizing pulses on line 13. The 1f$_H$ synchronizing signals on line 15, shown in FIG. 5(a), are an input to phase comparator 16. The output of phase comparator 16 on line 15, shown in FIG. 5(b), is an error control signal input to low pass filter 20'. The frequency characteristic of the low pass filter in the TA8360, for example, is determined primarily by external timing components. Accordingly, block 20' is shown by dashed lines. The external elements may be a series R-C network, having a 10 microfarad capacitor and a 3K resistor coupled between the capacitor and ground. Voltage controlled oscillator 48 operates at a 32f$_H$ rate, responsive to a ceramic, resonant circuit 50. A nominal 32f$_H$ timing signal on line 49, shown in FIG. 5(c), is an input to a divide by 32 circuit 52. The output of the divide by 32 circuit on line 17 is a 1f$_H$ drive signal, shown in FIG. 5(d). The 1f$_H$ signal is an input on line 55 to the other input of phase comaprator 16, which can result in the error control voltage of FIG. 6(b) being adversely modified by a 1f$_H$ ripple as shown. In the event the width of the 1f$_H$ pulses being fed back to the phase comparator 16 are too wide, the pulse width can be reduced, for example by series coupled capacitor 54. The 32f$_H$ output of the resonant circuit 50 is also available externally of the 1-chip, on line 51.

A progressive scanning control circuit 56 also provides a number of control functions. The 32f$_H$ output of resonant circuit 50 on line 51 and the 1f$_H$ output on line 17 are inputs to a divide by 16 circuit 58. The 32f$_H$ signal provides a CLOCK input for circuit 58. The output of the divide by 16 circuit is a timing signal at a frequency of 2f$_H$, twice the 1f$_H$ rate of the output of the divide by 32 circuit. The 1f$_H$ timing signal on line 17 provides a PRESET synchronizing signal for initializing the counter of divide by 16 circuit 58 and synchronizing the circuit 16 with the 1f$_H$ VCO. The output of the divide by 16 circuit 58 on line 59 is an input to pulse width circuit 60. Pulse width circuit 60 assures that the width of the pulses in the uncorrected 2f$_H$-REF signal on line 61 will be wide enough to ensure proper operation of phase comparator 64 in the 1391 type integrated circuit 62.

As is the case with the circuit shown in FIG. 1, the 2f$_H$-REF signal is symmetrical only to the extent that the initial duty cycle of the 1f$_H$ signal is fifty percent.

Figure 5F:
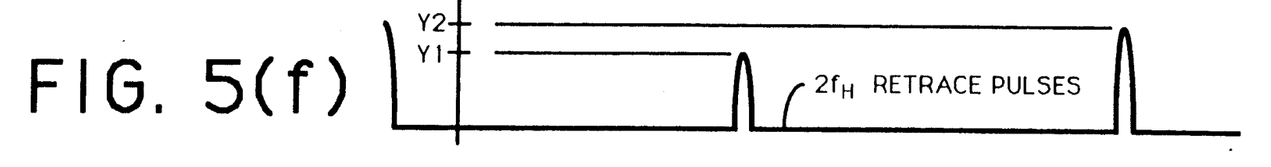

The effect of the $1f_H$ ripple on the error control voltage for the $32f_H$ VCO is reflected in the waveform of FIG. 5(b). The error control voltage periodically falls during each $1f_H$ period. Accordingly, the output frequency $f_{VCO}$ of the $32f_H$ VCO falls periodically, during each $1f_H$ period. As the frequency falls, each subsequent output pulse from the $32f_H$ VCO has a lower frequency. As the frequency decreases, the pulse width $1/f_{VCO}$ increases. The divider circuit 58 doubles the frequency of the $1f_H$ signal, which has a period of 32 output pulses of the $32f_H$ VCO, by dividing the period in half, that is, into two sixteen pulse periods. However, due to the falling $1f_H$ VCO frequency and due to the periodically increasing pulse widths, the aggregate width of the first sixteen pulses, $t_A$ is less than the aggregate width of the next sixteen pulses, $t_B$. When the duration of $t_A$ is not equal to the duration of $t_B$, the $2f_H$-REF timing signal is not symmetric within the period of the $1f_H$ signal, notwithstanding the precision of the digital divider. This asymmetry can cause retrace pulses of alternating amplitudes Y1 and Y2 as shown in FIG. 5(f), which are analogous to the retrace pulses shown in FIG. 2(e), and which can result in the raster splitting. The $2f_H$-REF signal generated by the digital circuit must therefore also be treated as an uncorrected signal, which requires further processing.

The error control signal of phase comparator 64 on line 65 is an input to low pass filter 63. The output of low pass filter 63 is a control input to voltage controlled oscillator 66, which operates at a $2f_H$ rate, and is denoted $2f_H$ VCO. The operating frequency of a type 1391 oscillator and the frequency response of the low pass filter are determined by external timing components, as shown in more detail in FIG. 7. Accordingly, block 63 is shown by dashed lines. The frequency characteristic of the low pass filter 63 is determined by the series R-C network formed, for example, by 1.5 microfarad capacitor C53 and 2K resistor R68. The output of voltage controlled oscillator 66 on line 67 provides CORRECTED $2f_H$ synchronizing signals for a horizontal output circuit 68. The output of the horizontal output circuit 68 on line 69 provides a $2f_H$ signal in the form of $2f_H$ RETRACE pulses. The $2f_H$ RETRACE pulses are an input to ramp generator 70, which is subject to a manual phase delay by manual delay circuit 72. The output of ramp generator 70 on line 71 is AC coupled by capacitor C56 to the other input of phase comparator 64 by line 73.

Figure 6A:
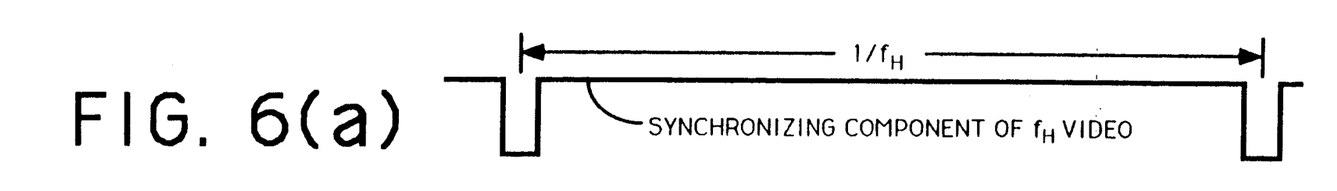
FIGS. 6(a), 6(b), 6(c) and 6(d) are waveforms useful for explaining the manual phase adjustment between $1f_H$ and $2f_H$ synchronizing signals for the circuit shown in FIGS. 4 and 7.
Figure 6B:
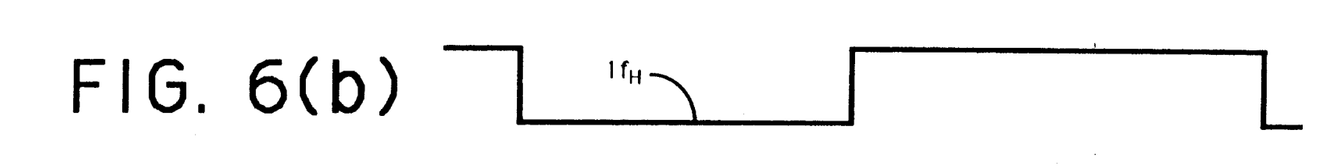
Figures 6C, 6D:
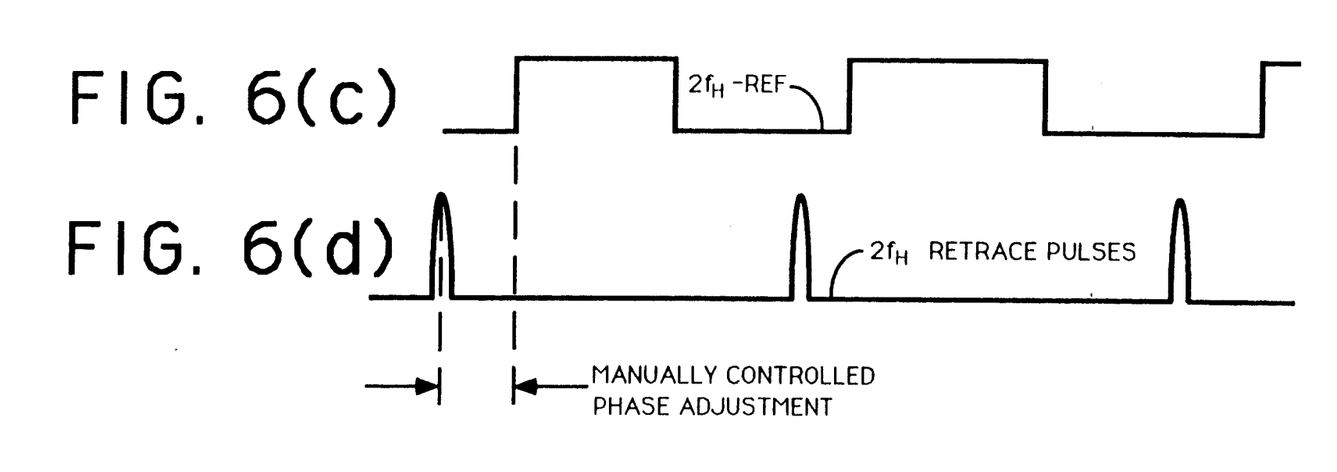

The waveforms of FIGS. 6(a)–6(d) illustrate the relative phase positions of the $1f_H$ and $2f_H$-REF timing signals generated in the circuit of FIG. 4. FIG. 6(a) illustrates the $1f_H$ SYNC pulses separated by sync separator 44 and provided to phase comparator 16 on line 13. FIG. 6(b) shows the $1f_H$ output of the divide by 32 circuit 52 on line 53. The first phase locked loop is therefore responsible for maintaining the relative phase of the leading edge of the $1f_H$ pulses and the midpoint, for example, of the $1f_H$ SYNC pulses. This alignment can be adjusted by means of delay or filter circuit 54. As illustrated in FIGS. 6(a) and 6(b), the delay circuit 54 is not inserting any delay. FIG. 6(c) illustrates the $2f_H$-REF signal generated by pulse width circuit 60 on line 61, which is one of the inputs to phase comparator 64 of the second phase locked loop 62. As is the case with the circuit of FIG. 1, the second phase locked loop 62 of FIG. 4 is effective to lock the CORRECTED $2f_H$ signal to the $1f_H$ synchronizing signal and is effective to average out the asymmetric timing errors in the uncorrected $2f_H$-REF signal due to $1f_H$ jitter. FIG. 6(d) shows the $2f_H$ RETRACE pulses on line 69, which are an input to a ramp generator 70. A manual control circuit 72 for the ramp generator 70 enables adjustment of the difference in phase between the CORRECTED $2f_H$ pulses and the $2f_H$-REF pulses.

Figure 7:
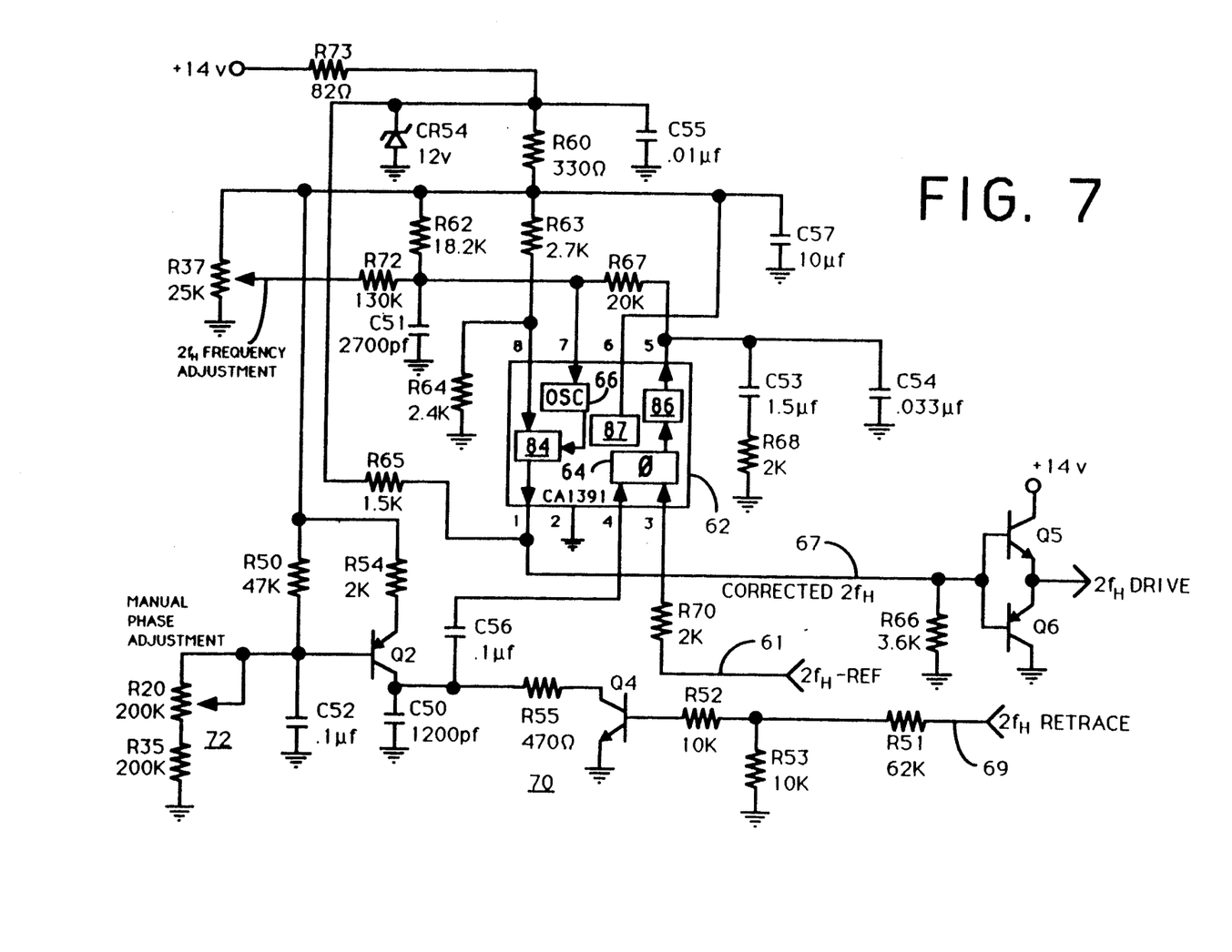
FIG. 7 is a circuit diagram showing the second phase locked loop of FIG. 4 in more detail.

A circuit schematic for a portion of the block diagram shown in FIG. 4 is shown in FIG. 7. Circuit 62 is embodied as an industry type CA1391 integrated circuit. The circuit 62 contains an oscillator 66, phase detector 64, predriver 84, phase detector output driver 86 and Vcc voltage regulator 87. The oscillator 66 is an RC type with terminal 7 used to control frequency. An external capacitor C51 is connected from terminal 7 to ground and charges through external resistance R62 coupled between terminals 6 and 7. When the voltage at terminal 7 exceeds an internal potential bias, capacitor C51 is discharged through an internal resistor. This conduction causes generation of a drive pulse, which terminates when the capacitor is sufficiently discharged. The discharge cycle is responsive to a sawtooth signal at terminal 4. Negative-going synchronizing pulses at terminal 3 are phase compared with the sawtooth waveform at terminal 4, which is derived from horizontal flyback or retrace pulses. If there is no phase difference between the synchronizing signal and the sawtooth waveform, there is no net output current at terminal 5. When a phase offset occurs, current flows either in or out of terminal 5 to correct the frequency. The duty cycle, or mark space ratio, of the predriver 84 may be adjusted by setting the potential at terminal 8. In the circuit of FIG. 7, this is determined by the voltage divider formed by resistors R63 and R64. Potentiometer R37, coupled to terminal 7 through resistor R72, may be used to manually adjust the frequency of oscillator 66.

The ramp generating circuit 70 comprises transistor Q4, resistor R55 and capacitor C50. The ramp signal generated across capacitor C50 is AC coupled to terminal 4 through capacitor C56. A transistor Q2 and potentiometer R20 form a manually operable delay circuit 72, which varies the current needed to charge the ramp capacitor. Variation of the time needed to charge capacitor C50 provides a variable delay of approximately from 0–2 microseconds in the relative phase of the $2f_H$-REF pulses and the CORRECTED $2f_H$ pulses.

The CORRECTED $2f_H$ output of predriver 84 on line 67 is an input to a push-pull driver circuit comprising transistors Q5 and Q6, which provides a $2f_H$ DRIVE output signal to the horizontal output circuit.

What is claimed is:

1. A synchronizing system, comprising:
a first phase locked loop having a first controllable oscillator and a first comparator, for generating a first timing signal at a first synchronizing frequency corresponding to a synchronizing component in a video signal;
means for deriving from said first timing signal and from said first oscillator a second timing signal, having a second frequency at a multiple of said first frequency and being subject to a variation in frequency at a rate corresponding to said first frequency;
a second phase locked loop, having a second comparator for receiving said second timing signal and a feedback signal in accordance with said second frequency and a second controllable oscillator for generating a synchronizing signal at said second frequency; and, an output deflection stage, coupled for receiving said synchronizing signal at said second frequency and for generating a retrace signal to which said feedback signal is related, for synchronized scanning in accordance with said second frequency, said second phase locked loop having a characteristic loop response preventing said second controlled oscillator from changing frequency as fast as said rate of variation of said second timing signal.

2. The system of claim 1, wherein said first phase locked loop comprises a feedback path for a feedback signal related to said first timing signal.

3. The system of claim 1, wherein said means for deriving said second timing signal is coupled between said first and second phase locked loops.

4. The system of claim 1, wherein said second phase locked loop comprises a low pass filter for controlling said voltage controlled oscillator, said low pass filter having a frequency characteristic defining said loop response.

5. The system of claim 1, wherein said feedback signal of said second phase locked loop is derived from said retrace pulses from said output deflection stage.

6. The system of claim 1, wherein said first timing signal has a frequency corresponding to a horizontal synchronizing component in said video signal and said feedback signal is related to horizontal retrace pulses.

7. The system of claim 1, wherein a sum of successive pulse periods of said second timing signal in each pulse period of said first timing signal is constant.

8. A synchronizing system, comprising:
a first phase locked loop including an oscillator and generating an $f_H$ timing signal synchronously with an $f_H$ synchronizing component in a video signal:
a second phase locked loop, having a comparator for receiving a $2f_H$ timing signal and a $2f_H$ feedback signal, a second oscillator for generating a $2f_H$ horizontal synchronizing signal and an output deflection stage for $2f_H$ synchronized scanning, coupled to said second oscillator and coupled to said comparator; and
means coupled between said first and second phase locked loops, responsive to said $F_H$ timing signal and said first oscillator from said first phase locked loop for generating said $2f_H$ timing signal as an input to said comparator of said second phase locked loop.

9. The system of claim 8, wherein said $2f_H$ timing signal is subject of a periodic variation in frequency at said $f_H$ rate and said second phase locked loop has a characteristic loop response preventing said second oscillator from changing frequency as fast as said rate of variation of said $f_H$ timing signal.

10. The system of claim 9, wherein said means coupled between said first and second phase locked loops comprises digital circuitry.

11. The system of claim 9, wherein said second phase locked loop comprises a low pass filter for controlling said second oscillator, said low pass filter having a frequency characteristic defining said loop response.

12. The system of claim 8, wherein said feedback signal is derived from retrace pulse from said output deflection stage.

13. The system of claim 8, wherein said $2f_H$ feedback signal is related to horizontal retrace pulses.

14. The system of claim 8, wherein a sum of successive pulse periods of said $2f_H$ timing signal in each pulse period of said $f_H$ timing signal is constant.

15. A synchronizing and deflection system, comprising:
a first phase locked loop having an $nf_H$ oscillator and a $1/n$ divider for generating a first timing signal at $f_H$ and related to a horizontal synchronizing component in a video signal;
counting means preset by said first timing signal and responsive to said $nf_H$ oscillator for deriving a second timing signal at $mf_H$;
a horizontal output deflection stage; and,
a second phase locked loop having a comparator for receiving said second timing signal and a feedback signal derived from said horizontal output deflection stage and a second oscillator for generating a scan synchronizing signal at $mf_H$, said horizontal output deflection stage being coupled to said second oscillator for synchronized horizontal scanning at $mf_H$.

16. The system of claim 15, wherein n and m are even valued integers and n is greater than m.

17. The system of claim 15, wherein n is 32 and m is 2.

18. The system of claim 15, wherein said second phase locked loop comprises a low pass filter for generating a control signal for said second oscillator which prevents said second oscillator from changing frequency as fast as changes occur in the frequency of said second timing signal.

19. The system of claim 15, wherein said feedback signal is related to retrace pulses of said horizontal output deflection stage.

20. The system of claim 15, wherein a sum of successive pulse periods of said second timing signal in each pulse period of said first timing signal is constant.

21. A synchronizing system, comprising:
a source of a video horizontal synchronizing component at a first frequency;
means coupled to said source for generating a timing signal synchronized with said horizontal synchronizing component and at a second frequency greater than said first frequency, said timing signal being subject to a timing error due to a periodic perturbation of said timing signal at said first frequency;
a horizontal deflection stage; and,
a phase locked loop for generating a scan synchronizing signal at said second frequency for synchronized horizontal scanning by said horizontal deflection stage, having means for comparing said timing signal and a feedback signal related to operation of said horizontal deflection stage, said phase locked loop having a characteristic response which substantially averages out said timing error in said timing to substantially preclude introduction of said periodic perturbation into said scan synchronizing signal.

22. The system of claim 21, wherein said second frequency is a multiple of said first frequency.

23. The system of claim 21, wherein said second frequency is an even multiple of said first frequency.

24. The system of claim 21, wherein said phase locked loop comprises a controllable oscillator and low pass filter for controlling said oscillator, said low pass filter defining said characteristic response.

25. The system of claim 21, wherein said feedback signal is related to retrace pulses.

26. The system of claim 21, wherein said means for generating said timing signal comprises:

a second phase locked loop synchronized with said horizontal synchronizing component; and,
a frequency converter synchronized with said second phase locked loop.

27. The system of claim 21, wherein a sum of successive pulse periods of said timing in each pulse period of said synchronizing component is substantially constant.

28. The system of claim 26, wherein said frequency converter comprises a presettable counter for dividing an oscillator signal from said second phase locked loop.

* * * * *